United States Patent
Graeber

(10) Patent No.: US 11,073,089 B2
(45) Date of Patent: Jul. 27, 2021

(54) GAS TURBINE ENGINE FOR AN AIRCRAFT

(71) Applicant: Rolls-Royce Deutschland Ltd & Co KG, Blankenfelde-Mahlow (DE)

(72) Inventor: Michael Graeber, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 202 days.

(21) Appl. No.: 16/355,095

(22) Filed: Mar. 15, 2019

(65) Prior Publication Data
US 2019/0292994 A1 Sep. 26, 2019

(30) Foreign Application Priority Data
Mar. 21, 2018 (DE) ...................... 10 2018 106 693.7

(51) Int. Cl.
| | | |
|---|---|---|
| *F02C 7/36* | (2006.01) | |
| *F01D 15/12* | (2006.01) | |
| *F16H 3/44* | (2006.01) | |
| *F16H 57/00* | (2012.01) | |
| *F02K 3/06* | (2006.01) | |

(52) U.S. Cl.
CPC .............. *F02C 7/36* (2013.01); *F01D 15/12* (2013.01); *F16H 3/44* (2013.01); *F16H 57/0025* (2013.01); *F02K 3/06* (2013.01)

(58) Field of Classification Search
CPC ... F02C 7/36; F01D 15/12; F16H 3/44; F16H 57/0025; F02K 3/06; F16B 43/00
USPC ................................................ 411/531, 533
See application file for complete search history.

(56) References Cited

U.S. PATENT DOCUMENTS

| | | |
|---|---|---|
| 5,391,125 A | 2/1995 | Turra et al. |
| 9,677,659 B1 | 6/2017 | Niergarth et al. |
| 2014/0124297 A1 | 5/2014 | Motto |
| 2016/0326902 A1 | 11/2016 | McCune et al. |
| 2018/0058571 A1 | 3/2018 | Madge et al. |

FOREIGN PATENT DOCUMENTS

| | | | |
|---|---|---|---|
| DE | 02010036247 A1 | 3/2012 | |
| GB | 1363151 A | 8/1974 | |
| GB | 1388959 A * | 4/1975 | ........... G02C 5/2281 |

OTHER PUBLICATIONS

German Search Report dated Jan. 29, 2019 for counterpart German Patent Application No. 10 2018 106 693.7.

\* cited by examiner

*Primary Examiner* — Richard A Edgar
(74) *Attorney, Agent, or Firm* — Shuttleworth & Ingersoll, PLC; Timothy Klima

(57) ABSTRACT

A gas turbine engine for an aircraft that includes an engine core, a fan, and a planetary gearbox. The planetary gearbox includes a sun gear, a plurality of planetary gears, a ring gear, a plurality of planetary pins, wherein respectively one planetary pin is arranged in a planetary gear, and an axially frontal support plate and an axially rear support plate, wherein the planetary pins are arranged in openings of the axially frontal support plate and of the axially rear support plate, and are connected to the support plates. At least one of the support plates has an axially protruding first centering collar that engages around the opening for the planetary pin, and that a second centering collar that is connected to the planetary pin or is formed in one piece with the same, engaging around the first centering collar radially outside in a form-fit manner. A planetary gearbox and an attachment arrangement.

16 Claims, 6 Drawing Sheets

GAS TURBINE ENGINE FOR AN AIRCRAFT

This application claims priority to German Patent Application DE102018106693.7 filed Mar. 21, 2018, the entirety of which is incorporated by reference herein.

DESCRIPTION

The invention relates to a gas turbine engine for an aircraft according to the present disclosure, as well as to a planetary gearbox and an attachment arrangement which can be used in a gas turbine engine.

It is known to couple the fan of a gas turbine engine to a turbine shaft via a gear. Such a gear can be embodied as a planetary gearbox, wherein the planetary gearbox receives an input from the turbine shaft and outputs drive for the fan for driving the fan with a lower rotational speed than the turbine shaft. The planetary gearbox comprises planetary gears that are driven by a sun gear and rotate in a ring gear. Arranged in the planetary gears is respectively one planetary pin which is attached in support plates of a planetary carrier. The planetary carrier is coupled to a drive for the fan.

For attaching a planetary pin in the support plates of the planetary carrier, it is known to arrange the planetary pin by realizing a strong press fit in the openings of the support plate to ensure that the press fit is securely maintained even in the event that higher centrifugal forces occur, that no local opening and thus no wear to the mating surfaces is allowed to occur, and that no oil can escape from the press fit or from the oil lines that are integrated in the press fit. This entails a high production-technical effort and the danger of the involved parts being damaged.

The present invention is based on the objective of providing a gas turbine engine, a planetary gearbox and an attachment arrangement in which a planetary pin is reliably attached in a support plate even if higher radial forces are acting, without a strong press fit being necessary for this purpose.

This objective is achieved with a gas turbine engine with features as disclosed herein, a planetary gearbox with features as disclosed herein, and an attachment arrangement with features as disclosed herein. Embodiments are disclosed herein.

Accordingly, in a first aspect of the invention, the present invention regards a gas turbine engine for an aircraft that has an engine core comprising a turbine, a compressor, and a turbine shaft that is embodied as a hollow shaft and connects the turbine to the compressor. Further provided is a fan that is positioned upstream of the engine core, wherein the fan comprises multiple fan blades. A planetary gearbox receives an input from the turbine shaft and outputs drive for the fan for driving the fan with a lower rotational speed than the turbine shaft. The planetary gearbox comprises a sun gear that rotates about a rotational axis of the planetary gearbox and is driven by the turbine shaft. A plurality of planetary gears is driven by the sun gear. The plurality of planetary gears is in mesh with a ring gear. What is further provided is a plurality of planetary pins, wherein respectively one planetary pin is arranged inside a planetary gear. The planetary gearbox comprises an axially frontal support plate and an axially rear support plate, wherein the planetary pins are arranged in openings of the axially frontal support plate and of the axially rear support plate, and are connected to the support plates. The axially frontal support plate is coupled to the drive for the fan.

It is provided that at least one of the support plates has an axially protruding first centering collar that engages around the opening for the planetary pin, and a second centering collar that is connected to the planetary pin or is formed in one piece with the same, and that engages around the first centering collar in a form-fit manner radially outside.

Through a form fit between the first centering collar that engages around the opening for the planetary pin and the second centering collar that engages around the first centering collar radially outside, the solution according to the invention achieves that the centrifugal forces acting on the planetary pin reinforce the pressing force of the connection. Through a centrifugal force, a radially outward force acts on the planetary pin and thus on the second centering collar in the radially outer area of the planetary pin. In this way, the second centering collar is pressed in a stronger manner against the first centering collar in the radially inner area of the planetary pin, whereby the pressing force between the first centering collar and the second centering collar is increased. Thus, the occurring centrifugal force increases the pressing force between the first centering collar and the second centering collar.

The described effect is based on the fact that, since the second centering collar that is connected to the planetary pin or is formed in one piece with the same is arranged radially outside of the first centering collar that is connected to the support plate, an inversion of the occurring forces takes place in the sense that centrifugal forces acting radially outside at the planetary pin create forces of the second centering collar on the first centering collar radially inside. In this way, a deformation of the support plate is also reduced.

Due to an increase of pressing force between the first centering collar and the second centering collar and thus between the planetary pin and the support plate during the occurrence of centrifugal forces it is not necessary to provide a press fit between the planetary pin and the support plate. Even though a press fit can be provided between the first and the second centering collar, it is sufficient here to provide only a light press fit. Due to the described mechanism, a press fit between the first centering collar and the second centering collar is still maintained in all operational conditions.

Thanks to the invention, mounting and dismantling of the planetary gearbox or of the engine in which the planetary gearbox is embodied are simplified. No elaborate tools for creating a strong press are necessary, and the danger of any damage to the components during mounting and dismantling are considerably reduced in this way.

The connection of the planetary pin to the support plate by means of two centering collars that abut each other in a form-fit manner thus considerably prevents or reduces any deformation to the support plate and the opening for the planetary pin as they occur due to centrifugal forces. Correspondingly, any loosening of the press fit of the planetary pin in the support plate is also prevented.

In one embodiment of the invention, it is provided that the second centering collar is formed at a centering disc that is placed onto a threaded pin of the planetary pin. Here, the second centering collar may for example be formed at the edge of the centering disc. It extends from the centering disc axially in the direction of the support plate, wherein it comes into abutment radially outside of the first centering collar when the second centering collar is pushed onto the first centering collar.

Here, it can be provided that the centering disc has some play with respect to the threaded pin before the latter is attached on the threaded pin. The radial orientation of the centering disc occurs automatically when the second centering collar is pushed onto the second centering collar.

The threaded pin typically has a smaller diameter than the planetary pin. Here, the threaded pin axially projects from a end face of the planetary pin.

According to one embodiment, the centering disc is attached on the threaded pin by means of at least one nut. Here, it can be provided that a washer is arranged between the centering disc and the nut.

According to this embodiment of the invention, the centering disc is connected to the end face of the planetary pin by means of a frictional engagement. Here, the area in which a frictional engagement is formed extends at the end face of the planetary pin radially outside of the threaded pin in the radial direction at the planetary pin. According to this embodiment, a load transmission at first occurs through the form fit between the first centering collar and the centering element and then through a frictional engagement between the planetary pin and the centering disc.

In one embodiment of the invention, it is provided that both support plates have an axially protruding first centering collar that surrounds the respective opening for the planetary pin, wherein a centering disc with a second centering collar is provided for connecting the planetary pin with at least one of the support plates. Here, according to one embodiment, the connection of the planetary pin to both support plates is established by means of a centering disc with a centering collar.

In contrast to that, it can be provided that the connection of the planetary pin to the support plate is made only at one of the two support plates by means of a centering disc with a centering collar, while a second centering collar formed in one piece with the planetary pin is provided for connecting the planetary pin with the support plate at the other support plate. In this way, positioning of the planetary pin in the radial and circumferential direction with respect to the support plate is achieved, and mounting is simplified.

Here, it is provided in one embodiment variant that, at its axial end, the planetary pin forms a radially extending disc-like section that leads radially past the first centering collar radial, and from which the second centering collar extends axially in the direction of the support plate, wherein the second centering collar engages around the first centering collar radially outside in a form-fit manner.

In one embodiment, it is provided that, at least at one of the support plates, the diameter of the planetary pin is smaller than the diameter of the opening in the support plate. In other words, what is present is a clearance fit of the planetary pin inside the opening. Taking into account manufacturing tolerances, the minimum dimensions of the opening are thus larger than the maximum dimensions of the planetary pin. Such a clearance fit allows for simplified manufacturing and mounting, while a form fit and a press fit are still achieved through the two centering collars.

In another embodiment of the invention, it is provided that one of the support plates forms a radially inwardly extending radial collar inside of which the planetary pin is received with a press fit, wherein the radial collar has a smaller diameter than the opening for the planetary pin in the support plate. Such a radial collar facilitates positioning of the planetary pin in the radial and circumferential direction with respect to the support plate. Here, a light press fit between the radial collar and the planetary pin is sufficient. According to one embodiment variant, such a design is provided at one of the support plates if the connection of the planetary pin with the support plate is provided at both support plates by means of a centering disc. For, through the radial collar, the planetary pin can at first be positioned at a support plate despite the clearance fit between the planetary pin and the corresponding opening in the support plate.

Here, according to one embodiment variant, the radial collar is formed in one piece with the first centering collar, so that both can be formed at a part at the support plate.

According to one embodiment of the invention, the first centering collar and/or the second centering collar are formed to be continuous in the circumferential direction, i.e. they are not provided with interruptions. In this way, the form fit between the two centering collars is optimal. However, alternatively it can also be provided that the first centering collar and/or the second centering collar are formed with interruptions in the circumferential direction. This is not harmful as long as the radially outer second centering collar can receive the forces that act on it radially through the first centering collar, and vice versa.

The planetary pin is formed cylindrically. Correspondingly, the respective opening for the planetary pin in the support plate is formed to be circular if it is not deformed by occurring forces.

For example, the first centering collar and the second centering collar may both be formed in a circular manner. However, in principle also a differing shape, for example a polygonal shape of the centering collar, can be provided.

According to one embodiment of the invention
the turbine is a first turbine, the compressor is a first compressor, and the turbine shaft is a first turbine shaft;
the engine core further comprises a second turbine, a second compressor, and a second turbine shaft that connects the second turbine to the second compressor; and
the second turbine, the second compressor and the second turbine shaft are arranged so as to rotate with a higher rotational speed than the first turbine shaft.

In a further aspect of the invention, the invention relates to a planetary gearbox, comprising:
a sun gear that rotates about a rotational axis of the planetary gearbox and is driven by a sun shaft,
a plurality of planetary gears that are driven by the sun gear,
a ring gear with which the plurality of planetary gears is in mesh,
a plurality of planetary pins, wherein respectively one planetary pin is arranged in a planetary gear,
an axially frontal support plate and an axially rear support plate, wherein the planetary pins are arranged in openings of the axially frontal support plate and the axially rear support plate, and are connected to the support plates, wherein
at least one of the support plates has an axially protruding first centering collar that engages around the opening for the planetary pin, and a second centering collar is provided that is connected to the planetary pin or is formed in one piece with the same, engaging around the first centering collar radially outside in a form-fit manner.

The embodiments disclosed herein also apply to the planetary gearbox disclosed herein.

In a further aspect of the invention, the invention relates to an attachment arrangement for connecting a pin to a plate that is arranged perpendicular to the pin, wherein the pin is arranged in an opening of the plate. It is provided that the plate has an axially protruding first centering collar that engages around the opening for the pin, and a second centering collar is provided that is connected to the pin or formed in one piece with the same, and engages around the first centering collar radially outside in a form-fit manner. Here, the second centering collar can be connected via a press fit to the first centering collar.

Further embodiments of the attachment arrangement are disclosed herein.

It is to be understood that, as far as it relates to an aircraft engine, the present invention is described with respect to a cylindrical coordinate system, having the coordinates x, r and φ. Here, x indicates the axial direction, r indicates the radial direction, and φ indicates the angle in the circumferential direction. Here, the axial direction is defined by the rotational axis of the planetary gearbox, which is identical to the machine axis of a gear fan engine in which the planetary gearbox is arranged. Beginning at the x-axis, the radial direction points radially outward. Terms such as "in front", "behind", "frontal" and "rear" always refer to the axial direction or the flow direction inside the engine in which the planetary gearbox is arranged. Terms such as "outer" or "inner" refer to the radial direction.

As is explained elsewhere herein, the present disclosure may relate to a gas turbine engine. Such a gas turbine engine can comprise an engine core which comprises a turbine, a combustion space, a compressor, and core shaft that connects the turbine to the compressor. Such a gas turbine engine can comprise a fan (with fan blades) that is positioned upstream of the engine core.

Arrangements of the present disclosure may be particularly, although not exclusively, beneficial for fans that are driven via a gearbox. Correspondingly, the gas turbine engine may comprise a gearbox that is driven via the core shaft, with its drive driving the fan in such a manner that it has a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and the compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gearbox may be embodied to be driven by the core shaft that is configured to rotate (for example in use) at the lowest rotational speed (for example the first core shaft in the example above). For example, the gearbox may be embodied to be driven only by the core shaft that is configured to rotate (for example in use) at the lowest rotational speed (for example only by the first core shaft, and not the second core shaft, in the example above). Alternatively, the gearbox may be embodied to be driven by one or multiple shafts, for example the first and/or second shaft in the above example.

In a gas turbine engine as described and/or claimed herein, a combustion space may be provided axially downstream of the fan and the compressor (or the compressors). For example, the combustion space may be located directly downstream of the second compressor (for example at the exit thereof), if a second compressor is provided. By way of further example, the flow at the exit to the combustor may be provided to the inlet of the second turbine, if a second turbine is provided. The combustion space may be provided upstream of the turbine(s).

The or each compressor (for example the first compressor and the second compressor according to the above description) may comprise any number of stages, for example multiple stages. Each stage may comprise a row of rotor blades and a row of stator vanes, which may be variable stator vanes (i.e. in that their angle of incidence may be variable). The row of rotor blades and the row of stator vanes may be axially offset with respect to each other.

The or each turbine (for example the first turbine and second turbine according to the above description) may comprise any number of stages, for example multiple stages. Each stage may comprise a row of rotor blades and a row of stator vanes. The row of rotor blades and the row of stator vanes may be axially offset with respect to each other.

Each fan blade may have a radial span width extending from a root (or hub) at a radially inner gas-washed location, or from a 0% span position to a tip with a 100% span width. Here, the ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in a closed range bounded by any two values in the previous sentence (i.e., the values may represent upper or lower bounds). These ratios may commonly be referred to as the hub-to-tip ratio. The radius at the hub and the radius at the tip may both be measured at the leading edge (or the axially forwardmost) edge of the blade. The hub-to-tip ratio refers, of course, to the gas-washed portion of the fan blade, i.e. the portion that is located radially outside any platform.

The radius of the fan may be measured between the engine centerline and the tip of a fan blade at its leading edge. The fan diameter (which may generally be twice the radius of the fan) may be greater than (or on the order of) any of: 250 cm (about 100 inches), 260 cm, 270 cm (about 105 inches), 280 cm (about 110 inches), 290 cm (about 115 inches), 300 cm (about 120 inches), 310 cm, 320 cm (about 125 inches), 330 cm (about 130 inches), 340 cm (about 135 inches), 350 cm, 360 cm (about 140 inches), 370 cm (about 145 inches), 380 (about 150 inches) cm or 390 cm (about 155 inches). The fan diameter may be in a closed range bounded by any two of the values in the previous sentence (i.e. the values may represent upper or lower bounds).

The rotational speed of the fan may vary during use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range from 1700 rpm to 2500 rpm, for example in the range of between 1800 rpm to 2300 rpm, for example in the range of between 1900 rpm to 2100 rpm. Purely by way of further non-limitative example, the rotational speed of the fan at cruise conditions for an engine having a fan diameter in the range of between 320 cm to 380 cm may be in the range of between 1200 rpm to 2000 rpm, for example in the range of between 1300 rpm to 1800 rpm, for example in the range of between 1400 rpm to 1600 rpm.

In use of the gas turbine engine, the fan (with the associated fan blades) rotates about a rotational axis. This rotation results in the tip of the fan blade moving with a velocity Utip. The work done by the fan blades on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as the fan tip radius at the leading edge multiplied by the angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (with all units in this paragraph being Jkg−1K−1/(ms−1)2). The fan tip loading may be in a closed range bounded by any two of the values in the previous sentence (i.e. the values may represent upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements, the bypass ratio may be greater than (or on the order of): 10, 10.5, 11, 11.5, 12, 12.5, 13, 13.5, 14, 14.5, 15, 15.5, 16, 16.5, or 17. The bypass ratio may be in a closed range bounded by any two of the values in the previous sentence (i.e. the values may represent upper or lower bounds). The bypass duct may be substantially annular. The bypass duct may be radially outside the core engine. The radially outer surface of the bypass duct may be defined by a nacelle and/or a fan housing.

The overall pressure ratio of a gas turbine engine as described and/or claimed herein may be defined as the ratio of the stagnation pressure upstream of the fan to the stagnation pressure at the exit of the highest-pressure compressor (before entry into the combustion space). By way of non-limitative example, the overall pressure ratio of a gas turbine engine as described and/or claimed herein at cruising speed may be greater than (or on the order of): 35, 40, 45, 50, 55, 60, 65, 70, 75. The overall pressure ratio may be in a closed range bounded by any two of the values in the previous sentence (i.e. the values may represent upper or lower bounds).

Specific thrust of an engine may be defined as the net thrust of the engine divided by the total mass flow through the engine. At cruise conditions, the specific thrust of an engine as described and/or claimed herein may be less than (or on the order of): 110 Nkg−1 s, 105 Nkg−1 s, 100 Nkg−1 s, 95 Nkg−1 s, 90 Nkg−1 s, 85 Nkg−1 s or 80 Nkg−1 s. The specific thrust may be in a closed range bounded by any two of the values in the previous sentence (i.e. the values may represent upper or lower bounds). Such engines may be particularly efficient as compared to conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of): 160 kN, 170 kN, 180 kN, 190 kN, 200 kN, 250 kN, 300 kN, 350 kN, 400 kN, 450 kN, 500 kN, or 550 kN. The maximum thrust may be in a closed range bounded by any two of the values in the previous sentence (i.e. the values may represent upper or lower bounds). The thrust referred to above may be the maximum net thrust at standard atmospheric conditions at sea level plus 15 deg C. (ambient pressure 101.3 kPa, temperature 30 deg C.), with the engine being static.

In use, the temperature of the flow at the entry to the high-pressure turbine may be particularly high. This temperature, which may be referred to as TET, may be measured at the exit to the combustion space, for example immediately upstream of the first turbine vane, which itself may be referred to as a nozzle guide vane. At cruising speed, the TET may be at least (or on the order of): 1400 K, 1450 K, 1500 K, 1550 K, 1600 K or 1650 K. The TET at cruising speed may be in a closed range bounded by any two of the values in the previous sentence (i.e. the values may represent upper or lower bounds). The maximum TET in use of the engine may be, for example, at least (or on the order of): 1700 K, 1750 K, 1800 K, 1850 K, 1900 K, 1950 K or 2000 K. The maximum TET may be in a closed range bounded by any two of the values in the previous sentence (i.e. the values may represent upper or lower bounds). The maximum TET may occur, for example, at a high thrust condition, for example at a maximum take-off (MTO) condition.

A fan blade and/or aerofoil portion of a fan blade as described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fiber. By way of further example at least a part of the fan blade and/or aerofoil may be manufactured at least in part from a metal, such as a titanium based metal or an aluminum based material (such as an aluminum-lithium alloy) or a steel based material. The fan blade may comprise at least two regions that are manufactured by using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fiber or aluminum based body (such as an aluminum lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture device which may engage a corresponding slot in the hub (or disc). Purely by way of example, such a fixture device may be present in the form of a dovetail that may be inserted into a corresponding slot in the hub/disc and/or may engage with the same in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow for the exit area of the bypass duct to be varied during operation. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may refer to the cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at the cruise condition may be any point in the range from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85, or in the range from 0.8 to 0.85. Any single speed within these ranges may be the cruise condition. For some aircrafts, the cruise conditions may be outside these ranges, for example below Mach 0.7 or above Mach 0.9.

Purely by way of example, the cruise conditions may correspond to standard atmospheric conditions at an altitude that is in the range from 10000 m to 15000 m, for example in the range from 10000 m to 12000 m, for example in the range from 10400 m to 11600 m (around 38000 ft), for example in the range from 10500 m to 11500 m, for example in the range from 10600 m to 11400 m, for example in the range from 10700 m (around 35000 ft) to 11300 m, for example in the range from 10800 m to 11200 m, for example in the range from 10900 m to 11100 m, for example on the order of 11000 m. The cruise conditions may correspond to standard atmospheric conditions at any given altitude in these ranges.

Purely by way of example, the cruise conditions may correspond to the following: a forward Mach number of 0.8; a pressure of 23000 Pa; and a temperature of −55 deg C.

As used anywhere herein, "cruise" or "cruise conditions" may refer to the aerodynamic design point. Such an aerodynamic design point (or ADP) may correspond to the conditions (comprising, for example, one or more of the Mach Number, environmental conditions and thrust requirement) in which the fan is designed to operate. This may mean, for example, the conditions at which the fan (or the gas turbine engine) is designed to have optimum efficiency.

During operation, a gas turbine engine as described and/or claimed herein may operate at the cruise conditions defined elsewhere herein. Such cruise conditions may be determined by the cruise conditions (for example the mid-cruise conditions) of an aircraft to which at least one (for example two or four) of the gas turbine(s) engine may be mounted in order to provide propulsive thrust.

The skilled person will appreciate that, except where mutually exclusive, a feature or parameter described in relation to any one of the above aspects may be applied to any other aspect. Furthermore, except where mutually exclusive, any feature or parameter described herein may be applied to any aspect.

In the following, the invention will be described in more detail based on multiple exemplary embodiments by referring to the Figures of the drawing. Herein:

Figure 6:
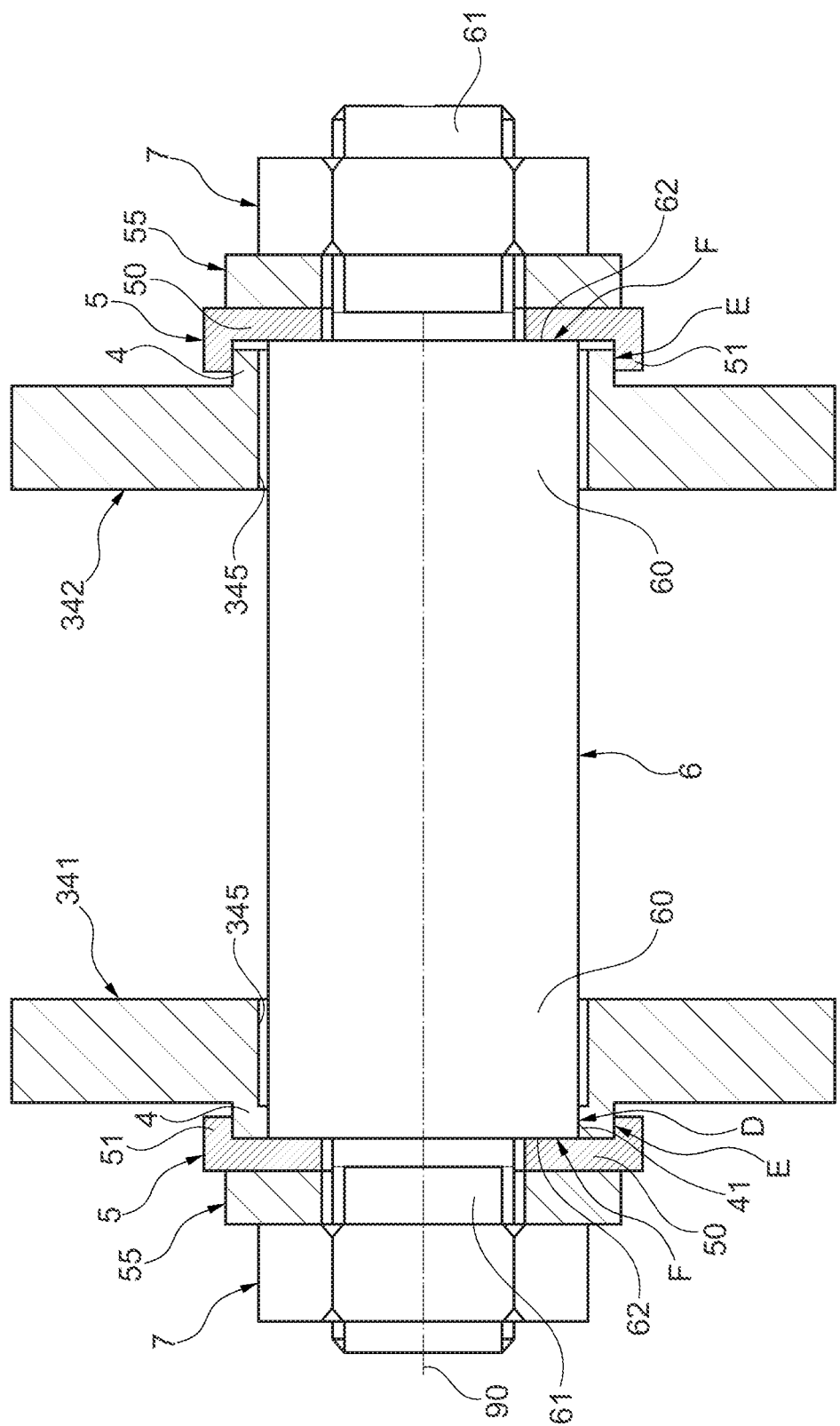
Figure 7:
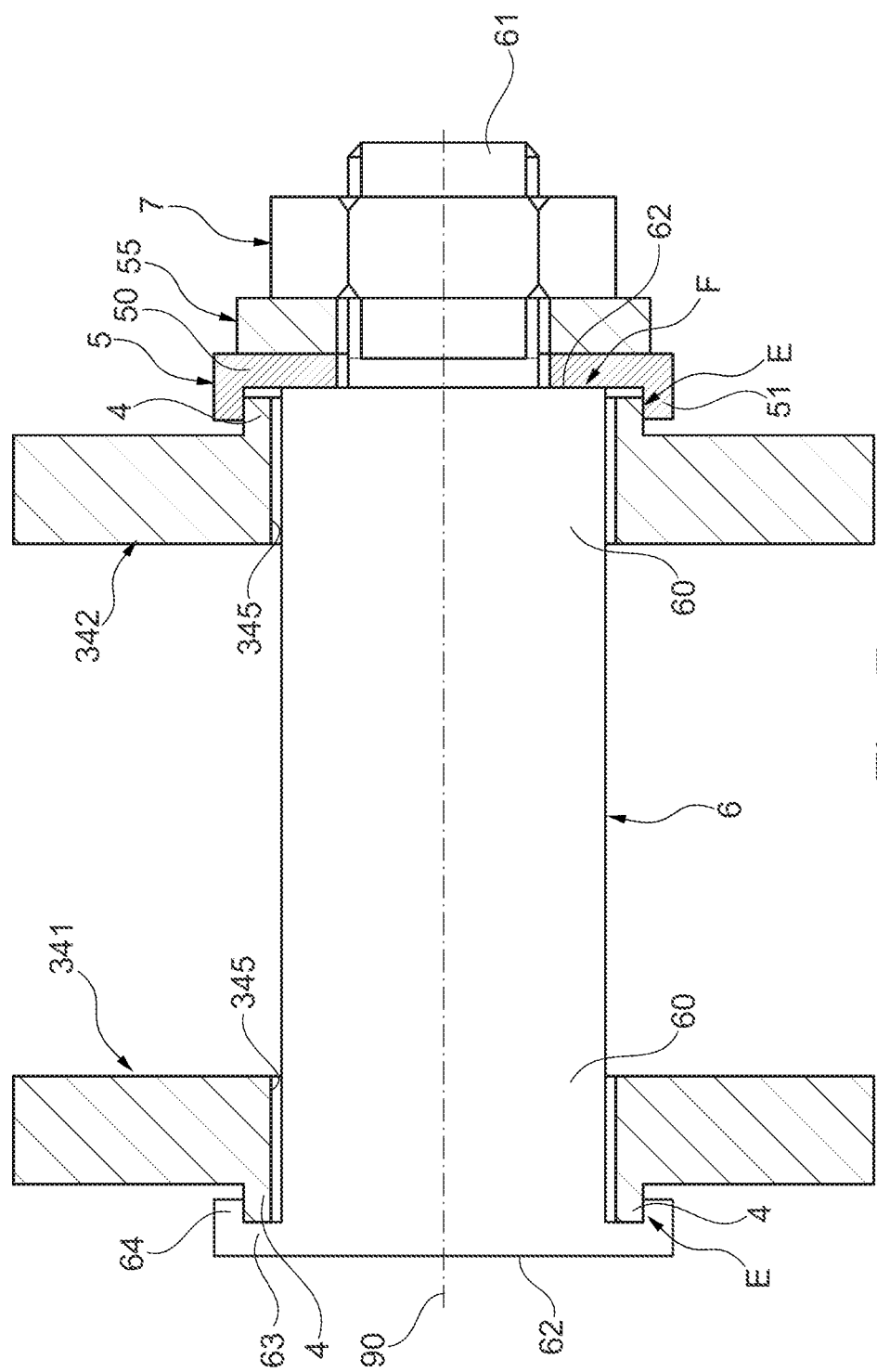

FIG. 6 shows an exemplary embodiment of the connection between a planetary pin and the two support plates of a planetary gearbox using respectively two centering collars, wherein the radially outer centering collar is provided at both support plates by a centering disc that is attached to a threaded pin of the planetary pin; and FIG. 7 shows a further exemplary embodiment of the connection between a planetary pin and the two support plates of a planetary gearbox using respectively two centering collars, wherein the radially outer centering collar is provided at the one support plate by a centering disc that is attached on a threaded pin of the planetary pin, and is formed at the other support plate in one piece with the planetary pin.

Figure 1:
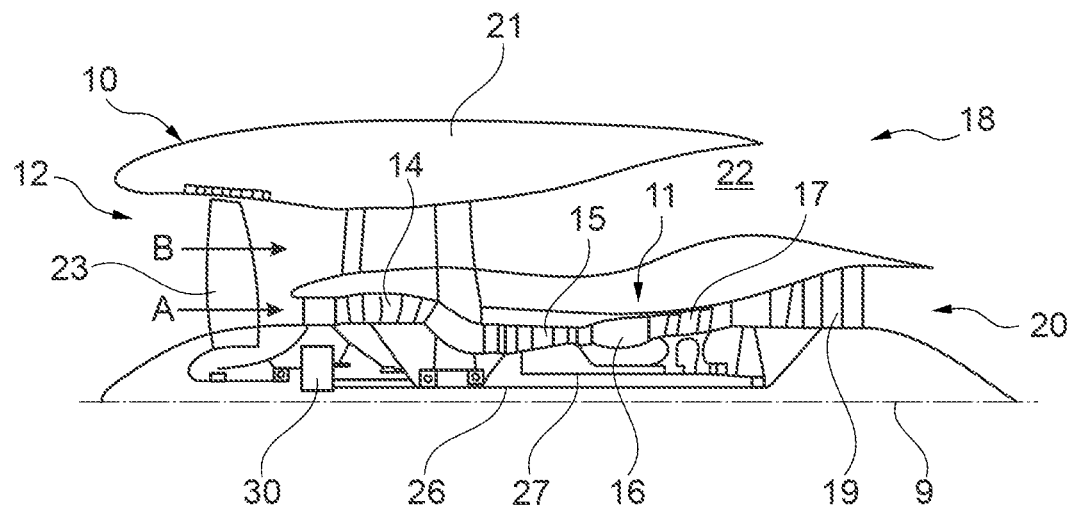
FIG. 1 shows a lateral sectional view of a gas turbine engine.

FIG. 1 describes a gas turbine engine 10 having a main rotational axis 9. The engine 10 comprises an air intake 12 and a thrust fan or fan 23 that generates two airflows: a core airflow A and a bypass airflow B. The gas turbine engine 10 comprises a core 11 that receives the core air flow A. The core engine 11 comprises, as viewed in the axial flow direction, a low-pressure compressor 14, a high-pressure compressor 15, combustion device 16, a high-pressure turbine 17, a low-pressure turbine 19 and a core engine exhaust nozzle 20. An engine nacelle 21 surrounds the gas turbine engine 10 and defines the bypass channel 22 and a bypass exhaust nozzle 18. The bypass airflow B flows through the bypass channel 22. The fan 23 is attached via a shaft 26 and an epicycloidal gearbox 30 at the low-pressure turbine 19 and is driven by the same.

During operation, the airflow A in the core engine 11 is accelerated and compressed by the low-pressure compressor 14, and is directed into the high-pressure compressor 15 where further compression takes place. The air that is discharged from the high-pressure compressor 15 in a compressed state is directed into the combustion device 16 where it is mixed with fuel and combusted. The resulting hot combustion products are then propagated through the high-pressure turbine 17 and the low-pressure turbine 19, and thus drive them before they are discharged through the nozzle 20 for providing a certain thrust. The high-pressure turbine 18 drives the high-pressure compressor 15 via a suitable connecting shaft 27. The fan 23 usually provides the greatest portion of the propulsive thrust. Generally, the fan 23 provides the main portion of the thrust. The epicycloidal gearbox 30 is a reduction gear.

Figure 2:
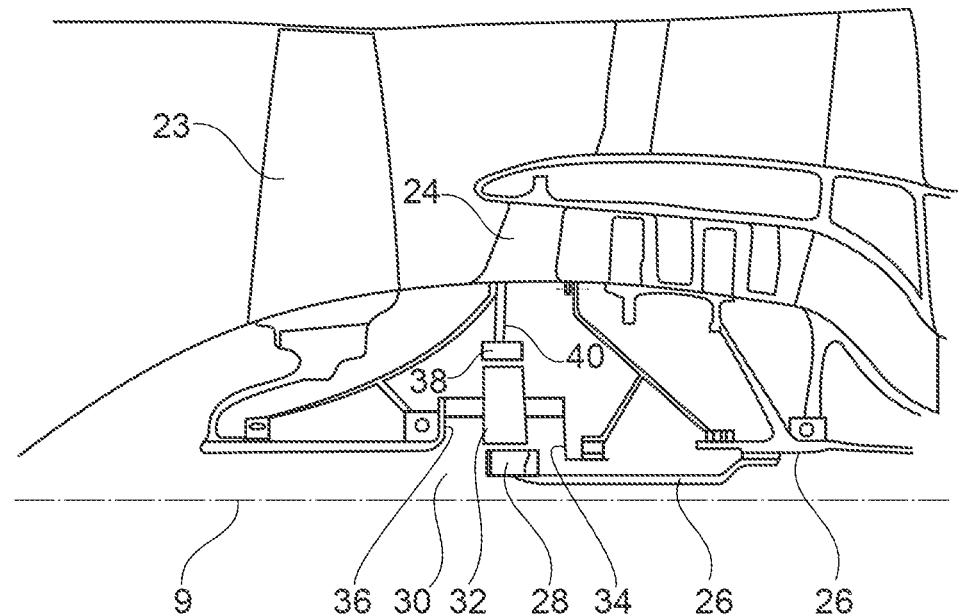
FIG. 2 shows an enlarged lateral sectional view of an upstream section of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicycloidal gearbox arrangement 30. Located radially outwardly of the sun gear 28 and intermeshing therewith is a plurality of planetary gears 32 that are coupled with each other by a planet carrier 34. The planetary carrier 34 limits the planetary gears 32 to rotating in synchronicity about the sun gear 28, whilst enabling each planet gear 32 to rotate about its own axis. Via linkages 36, the planetary carrier 34 is coupled to the fan 23 such that it causes its rotation about the engine axis 9. An outer gear or ring gear 38, which is coupled via linkages 40 to a stationary support structure 24, is located radially outside with respect to the planetary gears 32 and intermeshes therewith.

It should be noted that the terms "low pressure turbine" and "low pressure compressor" as used herein may be taken to refer to the turbine stage with the lowest pressure and the compressor stage with the lowest pressure (i.e., not including the fan 23) and/or refer to the turbine and compressor stage that are connected by the interconnecting shaft 26 with the lowest rotational speed in the engine 10 (i.e., not including the gearbox output shaft that drives the fan 23). In some documents, "low pressure turbine" and a "low pressure compressor", which are referred to herein, may alternatively also be known as an "intermediate pressure turbine" and an "intermediate pressure compressor". Where such alternative nomenclature is used, the fan 23 may be referred to as a first or lowest pressure stage.

Figure 3:
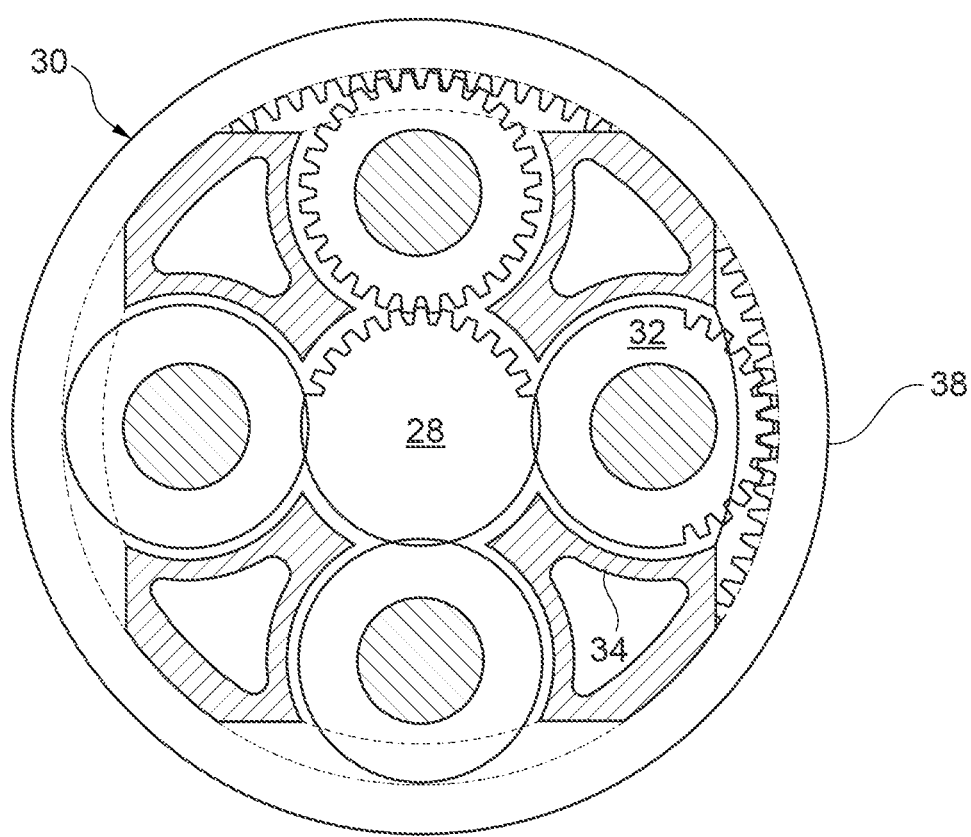
FIG. 3 shows a partial cut-away view of a gear for a gas turbine engine.

The epicycloidal gearbox 30 is shown in FIG. 3 in more detail by way of example. The sun gear 28, planetary gears 32 and the ring gear 38 respectively have teeth at their circumference to intermesh with the other gears. However, for reasons of clarity only exemplary portions of the teeth are illustrated in FIG. 3. Although four planetary gears 32 are illustrated here, it will be apparent to the person skilled in the art that more or fewer planetary gears 32 may be provided within the scope of the claimed invention. Practical applications of a epicyclic gearbox 30 generally comprise at least three planetary gears 32.

The epicycloidal gearbox 30 shown in FIGS. 2 and 3 by way of example is planetary gearbox, in which the planetary carrier 34 is coupled via linkages 36 to the output shaft, wherein the ring gear 38 is fixedly attached. However, it is possible to use any other kind of epicycloidal gearbox 30. As a further example, the epicycloidal gearbox 30 can be a star arrangement in which the planetary carrier 34 is supported in a fixedly attached manner, wherein the ring gear (or outer gear) 38 is allowed to rotate. In such an arrangement, the fan 23 is driven by the ring gear 38. As a further alternative example, the gearbox 30 can be a differential gear which allows for the ring gear 38 as well as planetary carrier 34 to turn.

It is to be understood that the arrangement shown in FIGS. 2 and 3 merely represents an example, and that various alternatives are included in the scope of the present disclosure. Merely as an example, any suitable arrangement for positioning the gearbox 30 in the engine 10 and/or for connecting the gearbox 30 to the engine 10 can be used. As a further example, the connections (e.g. the linkages 36, 40 in the example of FIG. 2) between the gearbox 30 and other parts of the engine 10 (such as e.g. the input shaft 26, the output shaft, and the fixed structure 24) can have a certain degree of stiffness or flexibility. As a further example, any suitable arrangement of the bearings between rotating and stationary parts of the engine (for example between the input and the output shaft of the gearbox and the fixed structures, such as e.g. the gearbox housing) can be used, and the disclosure is not limited to the exemplary arrangement of FIG. 2. For example, it will be obvious for a person skilled in the art that the arrangement of output and support linkages and bearing positions in a star arrangement (described above) of the gearbox 30 would usually differ from those that are shown by way of example in FIG. 2.

Correspondingly, the present disclosure extends to a gas turbine engine with any desired arrangement of gearbox types (for example star arrangements or planetary arrangements), support structures, input and output shaft arrangement, and bearing positions.

Optionally, the gearbox may drive auxiliary and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass channel 22 has its own nozzle which is separate from and arranged radially outside of the engine core nozzle 20. However, this is not to be taken in a limiting manner, and any aspect of the present disclosure may also apply to engines in which the flow through the bypass channel 22 and the flow through the core 11 are intermixed or combined in front of (or upstream) a single nozzle, which may be referred to as a mixed flow nozzle. One or both nozzles may have a fixed or variable area (independently of whether a mixed or a partial flow is present). Although the described example refers to a turbofan engine, the disclosure may for example be used in any kind of gas turbine engine, such as e.g. in an open rotor (in which the fan stage is not surrounded by a housing), or a turboprop engine. In some arrangements, the gas turbine engine 10 may comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the view of FIG. 1). The axial, radial and circumferential directions are mutually perpendicular.

Figure 4:
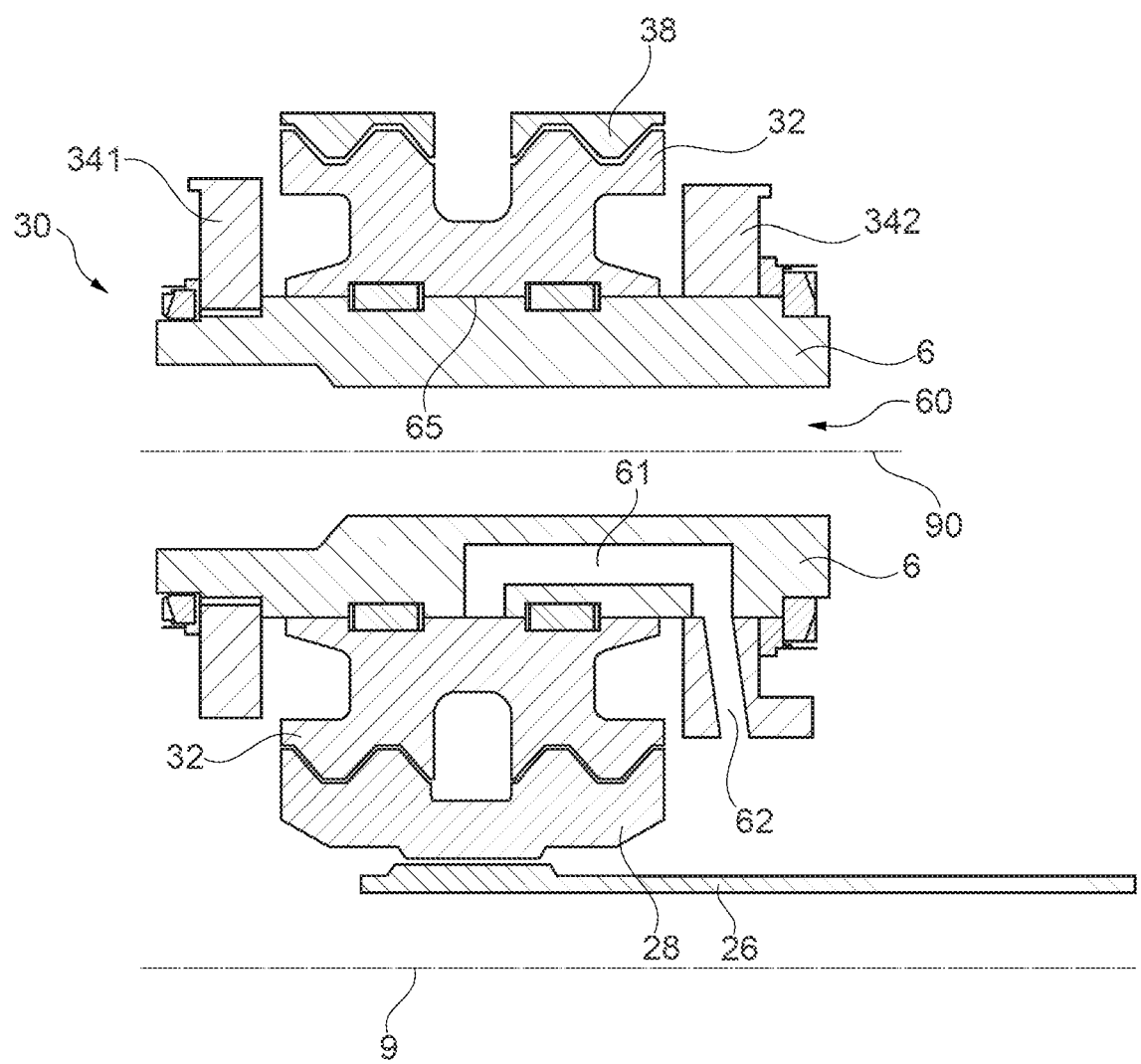
FIG. 4 (Prior Art) shows a sectional view of elements of a planetary gearbox suited for being used in a gas turbine engine according to FIG. 1.

FIG. 4 shows another exemplary embodiment of a planetary gearbox of a gas turbine engine 10 that is embodied as a geared fan engine according to FIG. 1 in a sectional view. The planetary gearbox 30 comprises a sun gear 28 that is driven by the drive shaft or sun shaft 26. The drive shaft 26 is a shaft 26 of FIGS. 1 and 2, or generally a turbine shaft. Here, the sun gear 28 and the drive shaft 26 rotate about the rotational axis 9. The rotational axis of the planetary gearbox 30 is identical to the rotational axis 9 or machine axis of the gas turbine engines 10.

The planetary gearbox 30 further comprises a plurality of planetary gears 32, of which one is shown in the sectional view of FIG. 4. The sun gear 28 drives the plurality of the planetary gears 32, wherein a toothing of the sun gear 28 is in mesh with a toothing of the planetary gear 32.

The planetary gear 32 is embodied in a hollow-cylindrical manner, and forms an outer shell surface and an inner shell surface. Driven by the sun gear 28, the planetary gear 32 rotates about a rotational axis 90 that extends in parallel to the rotational axis 9. The outer shell surface of the planetary gear 32 forms a toothing that is in engagement with the toothing of a ring gear 38. The ring gear 38 is arranged in a stationary, i.e. non-rotating, manner. The planetary gears 32 rotate as a result of being coupled to the sun gear 28, and in doing so travel along the circumference of the ring gear 38. The rotation of the planetary gears 32 along the circumference of the ring gear 38 and thus about the rotational axis 90 is slower than the rotation of the drive shaft 26, whereby a reduction is provided.

Adjacent to its inner shell surface, the planetary gear 32 has a centered axial opening. Inserted into the opening is a planetary pin 6 which itself has an axial bore 60, with its longitudinal axis being identical to the rotational axis 90 of the planetary gear 32, wherein the planetary pin 6 and the planetary gear 4 form a bearing 65 at their mutually facing surfaces, for example a roller bearing or a slide bearing.

FIG. 4 further shows a frontal support plate 341 and a rear support plate 342, which are a part of the planetary carrier 34, cf. FIG. 2. The planetary pin 6 is fixedly attached by means of the frontal support plate 341 and the rear support plate 342. For example, the frontal support plate 341 is connected to a torque carrier that is coupled to the fan shaft.

Provided for lubricating the bearing 65 between the planetary pin 6 and the planetary gear 32 is an oil supply appliance that comprises an oil supply channel 62 via which oil of a circulating oil system is guided inside lubricating film openings 61 in the planetary pin 6.

What is relevant in the context of the present invention is the connection of the planetary pin 6 to the support plates 341, 342.

Figure 5:
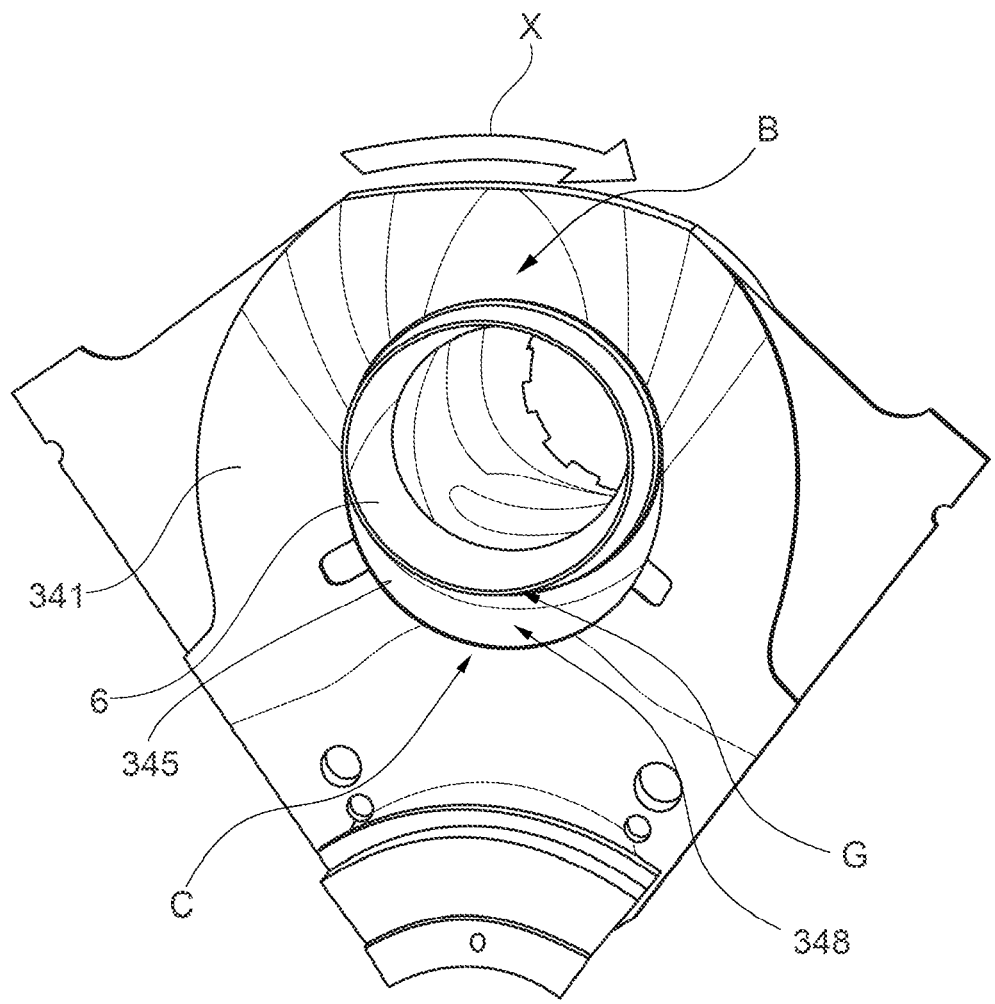
FIG. 5 (Prior Art) shows loads that are created by the centrifugal force and that act on a support plate through a planetary pin that is arranged in an opening of the support plate, and the deformations associated therewith in an arrangement according to the state of the art.

For this purpose, at first the disadvantages of an embodiment according to the state of the art are explained based on FIG. 5. The planetary pin 6 is arranged at both support plates 341, 342 (wherein only one support plate 341 is shown in FIG. 5) in an opening of the respective support plate. FIG. 5 shows a support plate 341 with a circular opening 345 inside of which the one end of the planetary pin 6 is arranged. The attachment between the planetary pin 6 and the support plate 341 is realized via a press fit of the planetary pin 6 in the opening 345 of the support plate 341.

The rotation X of the planetary carrier 34 and thus of the planetary pin 6 during operation of the planetary gearbox generates strong centrifugal forces that act on the support plate 341 and the planetary pin 6, and create a radially outwardly directed force. This force has to be received by the support plate 341. It leads to a radial deformation of the support plate 341 in the radially outer area B, and to a radial deformation of the planetary pin 6 in the radially inner area G. This is accompanied by a reduction of the pressing force of the press fit in the radially inner area C of the support plate 341, or even to the formation of a gap 348 between the edge of the opening 345 and the planetary pin 6. However, the formation of a gap 348 is to be avoided, since oil that is necessary for lubricating the engine may leak through such a gap, and wear to the press fit surfaces may occur through repeated opening and closing of the gap in the cyclical operation of the planetary gearbox. Therefore, it is necessary to provide a very strong press fit between the planetary pin 6 and the support plate 341. To achieve such a strong press fit, elaborate tools are necessary. This entails the danger of damage to the involved parts during mounting and dismantling.

FIG. 6 shows a first exemplary embodiment of an arrangement for connecting the planetary pin 6 to the support plates 341, 342 according to the invention. The planetary pin 6, which has a circular cross section, is connected to the support plates 341, 342 in a torque-proof manner at both its ends 60, which are arranged in circular openings 345 of the support plates 341, 342. At each support plate 341, 342, the arrangement comprises a first centering collar 4 that surrounds the opening 345 and protrudes axially. Here, both centering collars 4 project into axially opposite directions. The centering collar 4 of the axially frontal support plate 341 projects counter to the axial direction. The centering collar 4 of the axially rear support plate 342 projects in the axial direction, wherein the axial direction is the downstream direction in the engine.

The following explanation applies to both support plates 341, 342 or the connection of the planetary pin 6 to the respective support plate 341, 342.

Connecting to the first centering collar 4 radially outside is a second centering collar 51 of a centering element 5. At that, the second centering collar 51 is pushed onto the first centering collar 4, with a light press fit being formed. Since the second centering collar 51 surrounds the first centering collar 4 radially outside in a form-fit manner, a form fit is present between the two centering collars 4, 51 in the radial and circumferential direction.

In addition to the second centering collar 51, the centering element 5 comprises a centering disc 50 that is pushed with play onto a threaded pin 61 of the planetary pin 6. At that, the second centering collar 51 is formed at the radially outer edge of the centering disc 50 and extends axially opposite the disc plane. The threaded pin 61 is formed in one piece with the planetary pin 6 and has a smaller diameter than the planetary pin 6. Correspondingly, the planetary pin 6 forms an end face 62 that extends at the planetary pin 6 radially outside of the threaded pin 61 in the radial direction.

For attaching the centering disc 50 and for applying force to it, it is screwed in via a nut 7, wherein a washer 55 is arranged between the nut 7 and the centering disc 50, which is also pushed onto the threaded pin 61 with play.

The planetary pin 6 is arranged with play in the opening 345 of the axially rear support plate 342. In contrast to that, the axially frontal support plate 341 forms a radial collar 41 into which the planetary pin 6 is fitted with a light press fit D. The radial collar 41 serves for positioning the planetary pin 6 in the frontal support plate 341 in the radial and circumferential direction. As shown, it can be provided here that the radial collar 41 extends in the radial direction, starting from the first centering collar 4, so that the first centering collar 4 and the radial collar 41 are formed by the same part of the axially frontal support plate 341.

After the nut 7 has been screwed on, the second centering collar 51 sits radially outside of the first centering collar 4 in a form-fit manner, wherein the two centering collars 4, 51 are connected to each other by means of a light press fit E. In connection with the press fit E, the form fit positions and fixes the centering element 5 and the second centering collar 51 in the radial direction and in the circumferential direction with respect to a first centering collar 4.

Further, after the nut 7 has been screwed on, a frictional engagement F between the end face 62 of the planetary pin 6 and the adjoining surface of the centering disc 50 is established.

The functional principles of the attachment arrangement are as follows. Loads acting on the planetary pin 6 as created by the centrifugal force are transferred via the frictional engagement F from the planetary pin 6 and further via the form fit between the centering collars 4, 51 onto the support plates 341, 342.

At that, it is prevented by means of the form fit that occurring loads cause any loosening or even a release of the connection between the planetary pin 6 and the support plate 341, 342 at the radially inner area of the opening 345. This is based on the fact that the form fit is no longer present directly between the planetary pin 6 and the support plate 341, 342 as in the state of the art, but rather between a part that is connected to the planetary pin 6, namely the centering element 5 or its second centering collar 51, and the support plate 341, 342, wherein the second centering collar 51 engages around the corresponding first centering collar 4 of the support plate radially outside. In this way, the form fit is quasi inverted, since a force acting on the planetary pin radially outwards is turned via the centering element 5 into a force that acts on the first centering collar radially inside.

For, if the first centering collar 4 is deformed radially outwards—that is, upwards in the rendering of FIG. 6—due to the centrifugal force acting on the planetary pin 6, this deformation is transmitted to the second centering collar 51. As a result, the second centering collar 51 is pressed with an increased pressing force against the first centering collar 4 radially inside—that is, downwards in the rendering of FIG. 6. Thus, the press fit between the centering collars 4, 51, and thus the press fit between the planetary pin 6 and the support plate 341, 342, is even increased by the acting centrifugal forces. A gap formation as in FIG. 5 is no longer possible due to the inverted form fit of the centering collars 4, 51.

FIG. 7 shows a variation on the embodiment of FIG. 6, in which the second centering collar in the axially frontal support plate is formed not by a separate centering element, but in one piece with the planetary pin 6. For this purpose, at its axial end 62, the planetary pin has a radially extending section 63 that forms the second centering collar 64 which extends in the opposite axial direction to the first centering collar 4. Here, the second centering collar 64 is connected by means of a light press fit E with the first centering collar, as in the embodiment of FIG. 6.

Correspondingly, in this embodiment, a radial collar corresponding to the radial collar 41 of FIG. 6 is not necessary at the axially frontal support plate 341.

It is to be understood that the invention is not limited to the above-described embodiment examples, and that various modifications and improvements can be carried out without departing from the described concepts. In particular, it is obvious that the described arrangement for connecting the planetary pin to a support plate can be used not only with the planetary gearbox of a gas turbine engine, but in any planetary gearbox, and in general for connecting a pin to a plate.

It is to be understood that the invention is not limited to the above-described embodiment examples, and that various modifications and improvements can be carried out without departing from the described concepts. Any of the features can be used either separately or in combination with any of the other features, so long as they are not mutually exclusive, and the disclosure extends to all combinations and subcombinations of one or multiple features described herein, and includes the same. As far as ranges are defined, they comprise all values within these ranges as well as all partial ranges falling within a range.

The invention claimed is:

1. A gas turbine engine for an aircraft, comprising:
   an engine core that comprises a turbine, a compressor, and a turbine shaft configured as a hollow shaft that connects the turbine with the compressor;
   a fan positioned upstream of the engine core, wherein the fan comprises multiple fan blades; and
   a planetary gearbox that receives an input from the turbine shaft and outputs a drive for the fan for driving the fan with a lower rotational speed than the turbine shaft, wherein the planetary gearbox comprises:
   a sun gear that rotates about a rotational axis of the planetary gearbox and is driven by the turbine shaft,
   a plurality of planetary gears that are driven by the sun gear,
   a ring gear with which the plurality of planetary gears is in mesh,
   a plurality of planetary pins, wherein respectively one of the planetary pins is arranged in one of the one of the plurality of planetary gears,
   an axially frontal support plate and an axially rear support plate, wherein the plurality of planetary pins are arranged in openings of the axially frontal support plate and of the axially rear support plate and are connected to the axially frontal and axially rear support plates, and wherein the axially frontal support plate is coupled with the drive for the fan,
   wherein at least one chosen from the axially frontal and axially rear support plates includes an axially protruding first centering collar that engages around one of the openings for the one of the plurality of planetary pins, and
   a second centering collar connected to one of the plurality of planetary pins or formed in one piece with the one of the plurality of planetary pins and engaging around the first centering collar, radially outside of the first centering collar, in a form-fit manner.

2. The gas turbine engine according to claim 1, wherein the second centering collar is connected via a press fit to the first centering collar.

3. The gas turbine engine according to claim 1, and further comprising a centering disc positioned on a threaded pin of the one of the plurality of planetary pins, wherein the second centering collar is formed at the centering disc.

4. The gas turbine engine according to claim 3, and further comprising a clearance between the centering disc and the threaded pin.

5. The gas turbine engine according to claim 3, wherein the threaded pin has a smaller diameter than the one of the plurality of planetary pins.

6. The gas turbine engine according to claim 3, and further comprising a nut attaching the centering disc on the threaded pin.

7. The gas turbine engine according to claim 3, wherein the centering disc is connected to an end face of the one of the plurality of planetary pins via a frictional engagement.

8. The gas turbine engine according to claim 3, wherein both the axially frontal and axially rear support plates include one of the axially protruding first centering collars that engages around a respective one of the openings for the one of the plurality of planetary pins, and wherein the centering disc includes the second centering collar for connecting the one of the plurality of planetary pins to at least one chosen from the axially frontal and axially rear support plates.

9. The gas turbine engine according to claim 8, wherein another second centering collar is formed in one piece with the one of the plurality of planetary pins.

10. The gas turbine engine according to claim 8, wherein at least one chosen from the axially frontal and axially rear support plates includes a radially inwards extending radial collar inside of which the one of the plurality of planetary pins is positioned in a press fit.

11. The gas turbine engine according to claim 10, wherein the radial collar is formed in one piece with the first centering collar.

12. The gas turbine engine according to claim 8, wherein at least one chosen from the first centering collar and the second centering collar are formed so as to be continuous in a circumferential direction.

13. The gas turbine engine according to claim 1, wherein, the second centering collar extends radially outwardly past the first centering collar, and then extends axially in a direction of at least one chosen from the axially frontal and axially rear support plates, thereby engaging around a radially exterior of the first centering collar in a form-fit manner.

14. The gas turbine engine according to claim 1, wherein, for at least one chosen from the axially frontal and axially rear support plates, a diameter of the one of the planetary pins is smaller than a diameter of the one of the openings.

15. The gas turbine engine according to claim 1, wherein the turbine is a first turbine, the compressor is a first compressor, and the turbine shaft is a first turbine shaft;

the engine core further comprises a second turbine, a second compressor, and a second turbine shaft that connects the second turbine to the second compressor, and the second turbine, the second compressor and the second turbine shaft are arranged in such a manner that they rotate with a higher rotational speed than the first turbine shaft.

16. A planetary gearbox, comprising:

a sun gear that rotates about a rotational axis of the planetary gearbox and is driven by a sun shaft, a plurality of planetary gears that are driven by the sun gear, a ring gear with which the plurality of planetary gears are in mesh, a plurality of planetary pins, wherein respectively one of the plurality of planetary pins is arranged in one of the plurality of planetary gears, an axially frontal support plate and an axially rear support plate, wherein the planetary pins are arranged in openings of the axially frontal support plate and of the axially rear support plate, and are connected to the axially frontal and axially rear support plates, wherein at least one chosen from the axially frontal and axially rear support plates includes an axially protruding first centering collar that engages around one of the openings for the one of the plurality of planetary pins, and a second centering collar connected to one of the plurality of planetary pins or formed in one piece with the one of the plurality of planetary pins and engaging around the first centering collar, radially outside of the first centering collar, in a form-fit manner.

* * * * *